United States Patent
Zhao

(10) Patent No.: US 9,978,052 B2
(45) Date of Patent: May 22, 2018

(54) MULTI-PAYER PAYMENT SYSTEM

(71) Applicant: PAYPAL, INC., San Jose, CA (US)

(72) Inventor: Lucy Ma Zhao, Austin, TX (US)

(73) Assignee: PayPal, Inc., San Jose, CA (US)

( * ) Notice: Subject to any disclaimer, the term of this patent is extended or adjusted under 35 U.S.C. 154(b) by 798 days.

(21) Appl. No.: 13/899,333

(22) Filed: May 21, 2013

(65) Prior Publication Data

US 2014/0351118 A1 Nov. 27, 2014

(51) Int. Cl.
*G06Q 20/22* (2012.01)
*G06Q 20/10* (2012.01)
*G06Q 20/32* (2012.01)
G06Q 30/06 (2012.01)
G06Q 20/20 (2012.01)
G06Q 20/12 (2012.01)
G06Q 20/40 (2012.01)

(52) U.S. Cl.
CPC .......... *G06Q 20/227* (2013.01); *G06Q 20/102* (2013.01); *G06Q 20/3224* (2013.01); *G06Q 20/12* (2013.01); *G06Q 20/204* (2013.01); *G06Q 20/40* (2013.01); *G06Q 30/06* (2013.01); *G06Q 30/0601* (2013.01); *G06Q 30/0643* (2013.01)

(58) Field of Classification Search
CPC ...... G06Q 20/12; G06Q 20/204; G06Q 20/40; G06Q 30/06; G06Q 30/0601; G06Q 30/0643

USPC .......................................................... 705/40
See application file for complete search history.

(56) References Cited

U.S. PATENT DOCUMENTS

| | | | |
|---|---|---|---|
| 7,873,573 B2 * | 1/2011 | Realini | G06Q 20/04 235/379 |
| 9,799,069 B2 * | 10/2017 | Motenko | G06Q 30/0643 |
| 2013/0185192 A1 * | 7/2013 | McGuire | 705/39 |
| 2013/0297425 A1 * | 11/2013 | Wallaja | 705/14.64 |
| 2013/0317893 A1 * | 11/2013 | Nelson | G06Q 10/02 705/14.5 |
| 2014/0330654 A1 * | 11/2014 | Turney | G06Q 20/14 705/15 |
| 2014/0351130 A1 * | 11/2014 | Cheek et al. | 705/44 |

* cited by examiner

*Primary Examiner* — Scott S Trotter
(74) *Attorney, Agent, or Firm* — Haynes & Boone, LLP

(57) ABSTRACT

A method for providing multi-payer, location-based payments includes detecting at least one mobile device using a near field communication device. At least one of a plurality of secondary payers that is associated with a social network of a primary payer is determined to also be associated with the at least one detected mobile device. A first current location is determined, a first payee associated with the first current location is retrieved, and a preferred payment account for each secondary payer associated with a detected mobile device is retrieved. A payment application is then provided that allows payments to be made to the first payee from the primary payer via a first primary payer preferred payment account and from each secondary payer associated with a detected mobile device via a respective secondary payer preferred payment account.

20 Claims, 11 Drawing Sheets

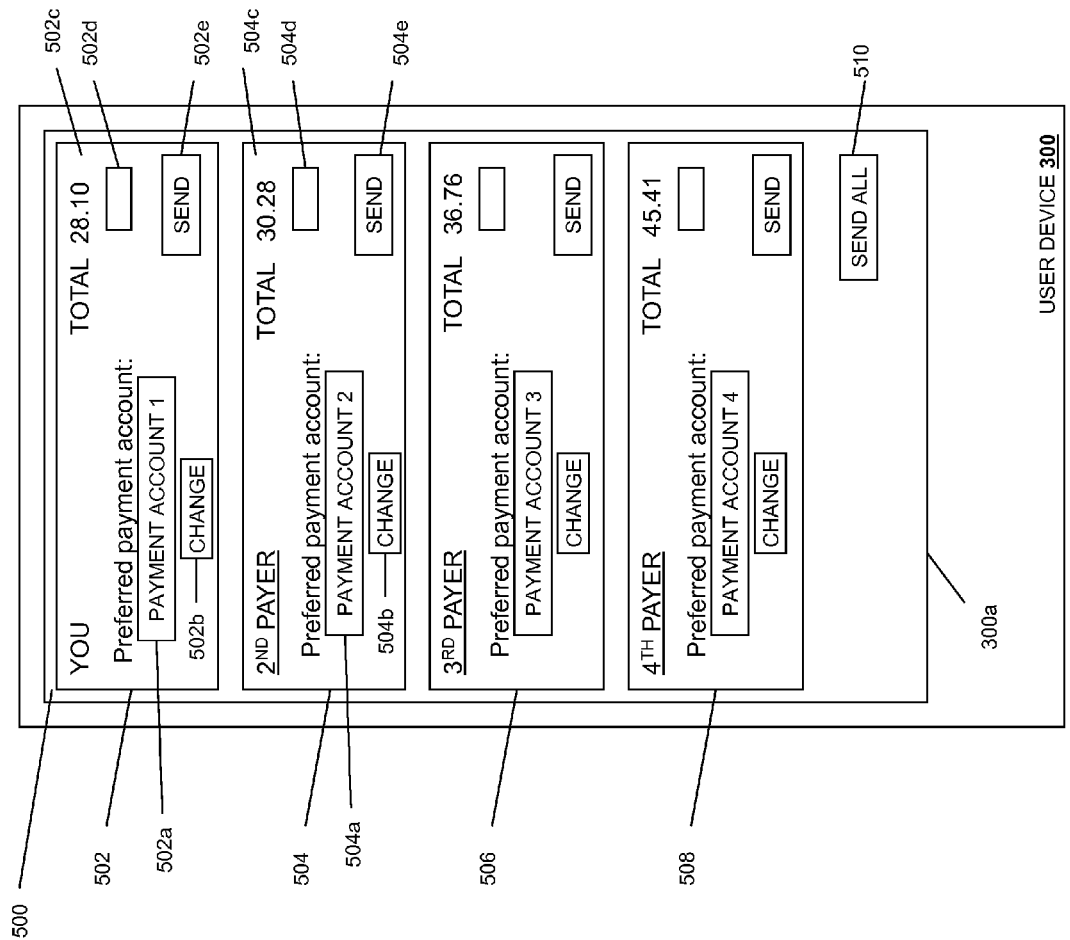

US 9,978,052 B2

MULTI-PAYER PAYMENT SYSTEM

BACKGROUND

Field of the Invention

The present invention generally relates to online and/or mobile payments and more particularly to systems and methods for allowing multiple payers to quickly and easily make payments to a payee as a group.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Online and/or mobile payments can be complicated when such payments are attempted by a group of payers. For example, a group of payers may go to a restaurant and receive a bill, and that bill must be split between each of the payers. Conventional group payment systems typically involve the manual entry of each of the payers into a payment application, the determination of which items on the bill each of the payers is responsible for, the sending of the appropriate portions of the bill to each of the payers, the provision of a payment account by each of the payers to use in making the payment for their portion of the bill, and finally the sending of an instruction to make the payment. Such conventional systems require a relatively large amount of time in making the manual determinations, entries, and selections discussed above, which may result in those systems not being used in favor of traditional physical payment devices such as cash or credit cards.

Thus, there is a need for an improved multi-payer payment system.

BRIEF DESCRIPTION OF THE FIGURES

FIG. 5 is a front view illustrating a user device displaying a payment screen;

Figure 1:
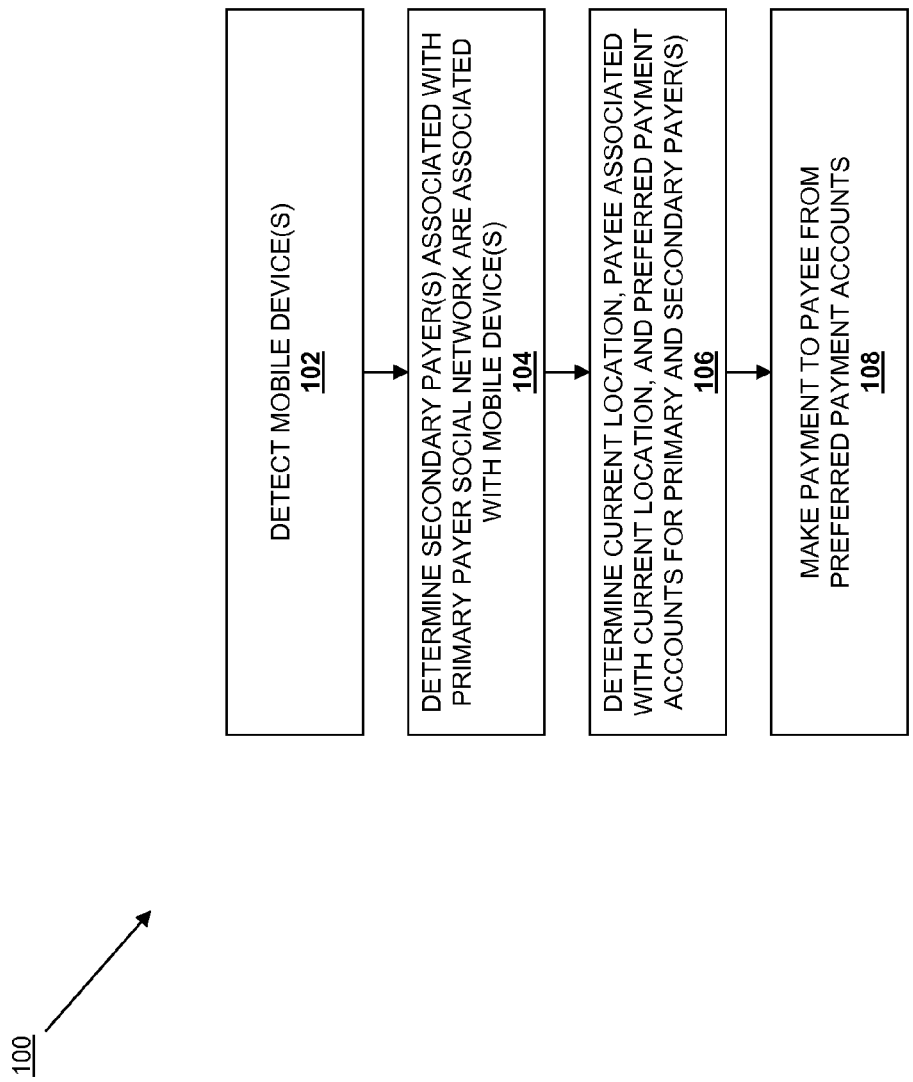
FIG. 1 is a flow chart illustrating an embodiment of a method for providing multi-payer payments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for allowing auto-detected, multi-payer, location-based payments that make multi-payer payments quick and easy while providing for payment details that may be specific to each payer. The systems and methods allow a group of payers to make a plurality of purchases from a payee, be automatically detected and have their preferred payment accounts for that payee retrieved, and then be provided a bill from the payee that may be easily split between the payers and quickly paid for with their respective preferred accounts.

Figure 2:
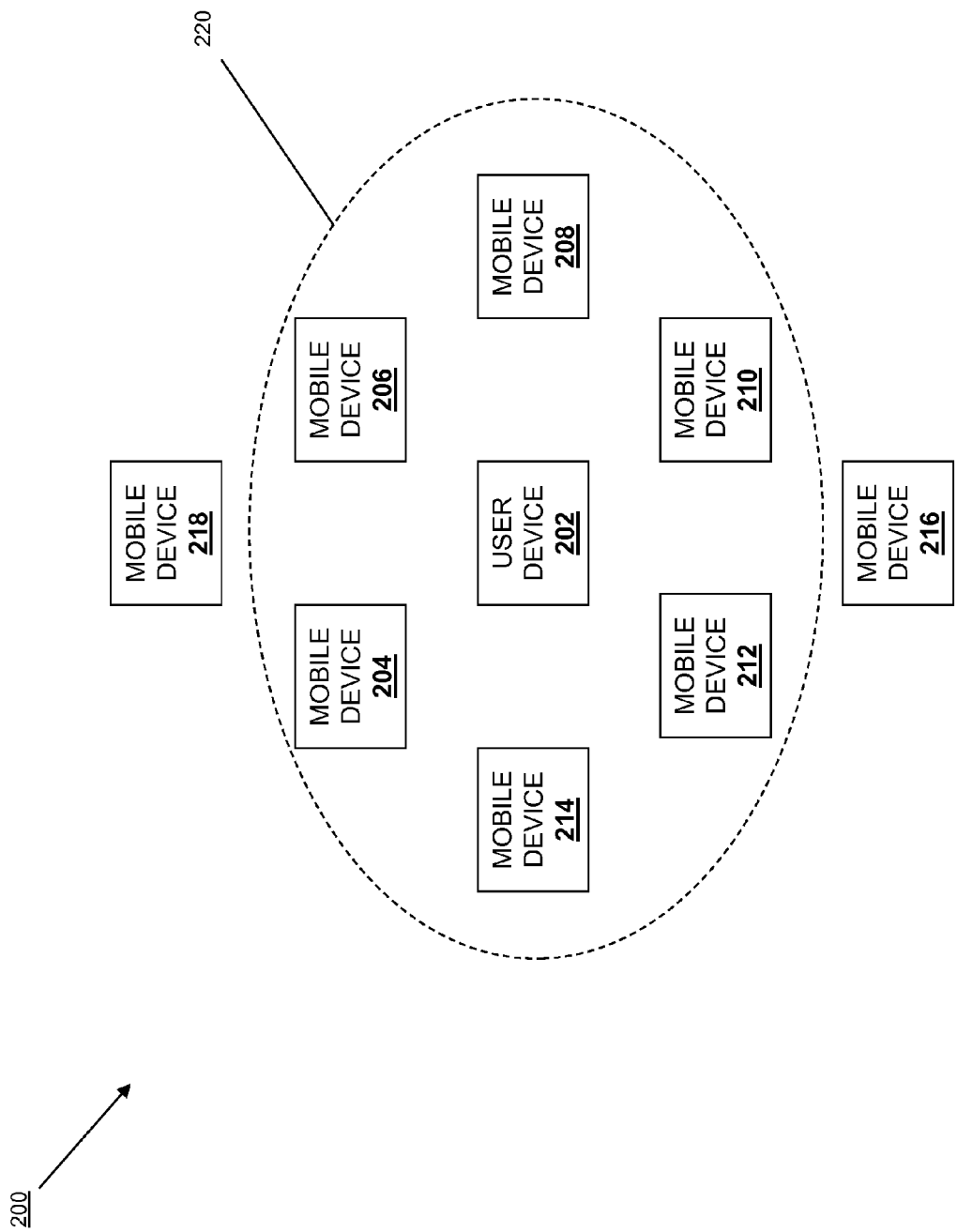
FIG. 2 is a schematic view illustrating an embodiment of a plurality of mobile devices.

Referring now to FIGS. 1 and 2, an embodiment of a method 100 for multi-payer payments is illustrated that begins at block 102 where at least one mobile device is detected. FIG. 2 illustrates an embodiment of a plurality of mobile devices including a user device 202 and a plurality of other mobile devices 204, 206, 208, 210, 212, 214, 216, and 218 in a particular location. In one example, each of the mobile devices 202-218 may be located in a restaurant or other payee location. In the embodiments provided below, the actions are performed mainly by a payment application on the user device 202, which is operated by a user that is referred to as a "primary payer user" in those embodiments. For example, a user may become a primary payer user by using the payment application on their user device 202 to split a bill (discussed below), and any other users associated with the mobile devices 204-218 that the user of the user device 202 associates with the bill may become secondary payer users. In an embodiment, the method 100 may begin by the primary payer user starting the payment application on the user device 202 and receiving a bill from a payee device over a network on the user device 202 (discussed below). However, the bill from the payee may be provided at any time during the method 100 without departing from the scope of the present disclosure. In an embodiment, any of the mobile devices 204-218 may be operated in the same manner as the user device 202 discussed herein.

The user device 202 is associated with a primary payer user that is further associated with a social network. For example, as is known in the art, a social network provider may include a social network provider device that provides a user with a user account, and that user account may be associated with the user device 202 through a mobile device identifier (e.g., a phone number, user credentials, etc.) The social network provider device also associates the user account with a plurality of other user accounts for "friends" of the user, and in the systems and methods described herein at least some of those other user accounts may be associated with one or more of the mobile devices 204-218 through a mobile device identifier (e.g., a phone number, user credentials, etc.) While a specific example has been provided of the association of a user and their user device 202 with at least one other user and their associated mobile device through a social network, one of skill in the art will recognize that users and their mobile devices may be associated via other social networks or in other manners without departing from the scope of the present disclosure.

The user device 202 and the mobile devices 204-218 may include near field communications device such as, for example, Bluetooth® communications devices, WiFi communications devices, and/or a variety of other near-field communications devices known in the art that allow the user device 202 and the mobile devices 204-218 to communicate. In the embodiment illustrated in FIG. 2, the near field communication device in the user device 202 may allow the user device 202 to communicate with the mobile devices 204-214 within a perimeter 220. Thus, at block 102, the mobile device 202 may detect each of the mobile devices 204-214, while not being able to detect the mobile devices 216 and 218. In an embodiment, the user of the user device 202 may be able to adjust the perimeter 220 such that the area within which other mobile devices are detected is limited. Such limited distance detection ability provides benefits when a group of users are together at a payee location (e.g., dining together), as mobile devices within the perimeter 220 may be detected while mobile devices outside the perimeter 220 (e.g., located at other tables in the restaurant) will not be.

Furthermore, the user device 202 may continually monitor the mobiles devices that are within the perimeter 220 such that the user device 202 is aware as mobile devices enter and leave the perimeter 220. While the detection of mobile devices at block 102 of the method 100 has been described above as being performed using near field communication devices, other communications technologies such as cellular and other relative far-field communications methods are envisioned as falling within the scope of the present disclosure.

Thus, in the illustrated embodiment, the user device 202 may detect each of the mobile devices 204-214, retrieve a mobile device identifier from each detected mobile device 204-214, and the method 100 may then proceed to block 104 where secondary payer users associated with a social network of a primary payer user are determined to be associated with some or all of the mobile devices detected in block 102. At block 104, the user device 202 may use its mobile device identifier to determine a social network of the primary payer user associated with the user device 202, and then the user device 202 may use the mobile device identifiers retrieved from each of the mobile devices 204-214 detected at block 102 to determine whether any of those mobile device identifiers are associated with the social network of the primary payer user. For example, the user device 202 may send the mobile device identifier for the user device 202 as well as the mobile devices identifiers for the mobile device 204-214 over a network to the social network provider device, and the social network provider device may send back to the user device 202 any users associated with mobile device identifiers that are associated with the social network of the primary payer user (e.g., as determined using the mobile device identifier for the user device 202.) As discussed below, users associated with the mobile devices detected at block 102 that are also part of the social network of the primary payer user may be referred to as secondary payer users. In one embodiment, secondary payer users include users who are not within the social network of the primary payer user, but are within a social network of a user within the social network of the primary payer user. In this situation, a shared group purchase may be a lunch where the primary payer user is friends with one secondary payer user, but not "friends" with another payer user, who is friends with the one secondary payer user (or a friend of a friend). In other embodiments, secondary payer users may include "friends" of "friends" of "friends" and beyond. In other words, detected secondary payer users may be indirectly related to the primary payer user through one or more social networks.

The method 100 then proceeds to block 106 where a current location is determined, a payee associated with the current location is determined, and preferred payment accounts for a primary payer user and any secondary payer users are determined. In an embodiment, at block 106, the user device 202 may use a location determination device such as a Global Positioning System (GPS) device to determine a current location of the user device 202. Using the current location, the user device 202 may retrieve a payee associated with the current location over a network such as the Internet. The user device 202 may then send the primary payer user and the secondary payer users, along with the payee associated with the current location, over a network to a system provider device that stores preferred payment accounts for the primary payer user and the secondary payer users. The system provider device may send back to the user device 202 a preferred payment account designated by each of the primary payer user and the secondary payer users for the payee associated with the current location.

Each of the primary payer user and the secondary payer users may designate one or more payment accounts for one or more payees that may be stored in a database by a payment service provider device or other system provider device. For example, the system provider device may be operated by a payment service provider such as PayPal, Inc of San Jose, Calif., that provides the user a payment service account that allows the user to make payments to payees using any of a plurality of financial accounts associated with the payment service account. The primary payer user and/or the secondary payer users may designate particular financial accounts (e.g., provided by account providers) associated with their payment service account with particular merchants or payees, purchase types, purchase amounts, etc. For example, the primary payer user may designate a first financial account as a default account for the payment service account, but may also designate a second financial account with a particular payee (e.g., a credit card offered by that payee that provides rewards), and a third financial account with a particular type of purchase (e.g., restaurant purchases may have a dining card that offers rewards when used at restaurants designated as their preferred payment account for a user). Secondary payees may designate financial accounts for particular payees, types of payees, or types of purchases in a similar manner. Thus, at block 106, the system provider device may determine the preferred financial account, designated for the payee, purchase type, or purchase amount, for each of the primary payer user and the secondary payer users.

In another embodiment, the method 100 may have begun in response to the primary payer user receiving a bill on a payment application operating on the user device 202 and, at block 106, the payee or purchase type may be determined from that bill without a need to determine a current location. Using that payee or purchase type, the user device 202 may then retrieve the preferred payment accounts for the primary payer user and secondary payer users substantially as discussed above.

Figure 3:
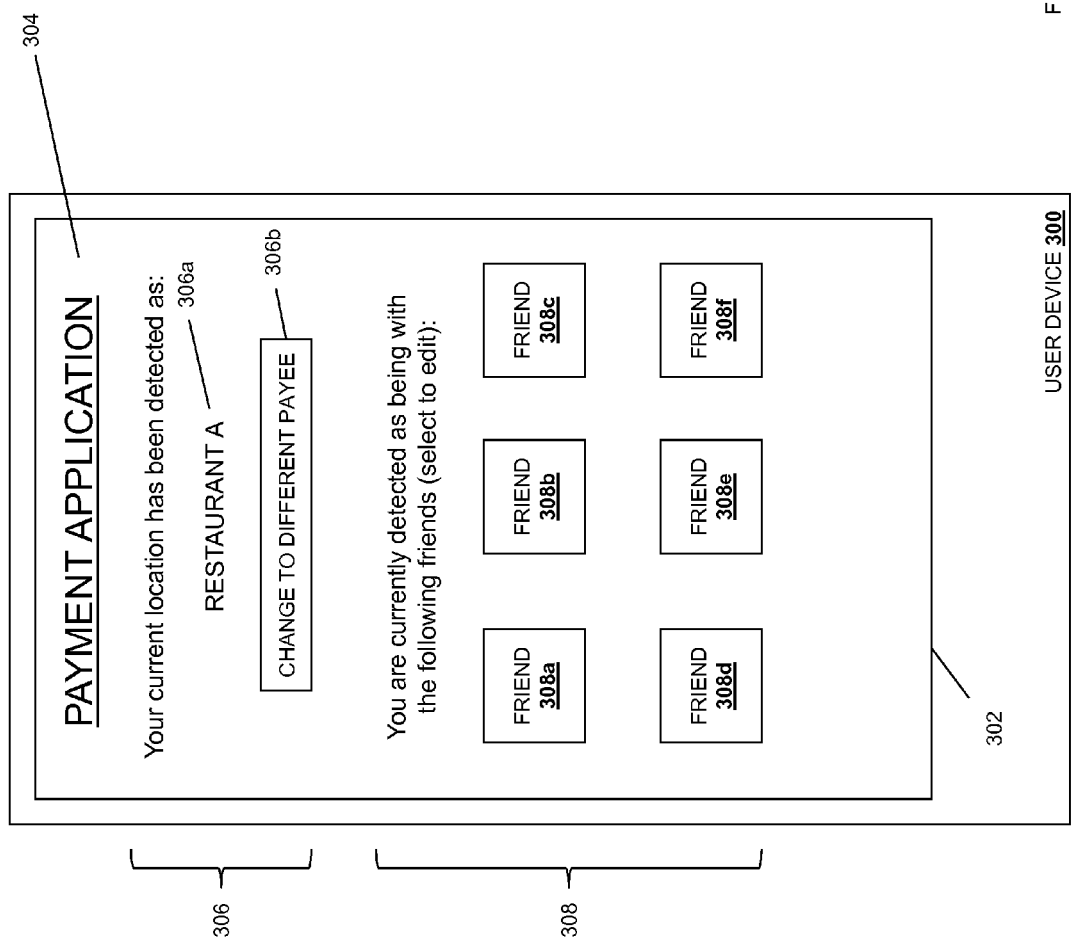
FIG. 3 is a front view illustrating an embodiment of a user device displaying a detection screen.

Referring now to FIG. 3, an embodiment of a user device 300 is illustrated. The user device 300 includes a display device 302 that is displaying an embodiment of a detection screen 304 provided by a payment application running on the user device 300. The detection screen 304 may be displayed following blocks 102, 104, and 106 of the method 100 discussed above. For example, the primary payer user may start a payment application on the user device 300 and, in response, the payment application may detect mobile devices near the user device 202, determine secondary payer users associated with those mobile devices that are also associated with a social network of the primary payer user, retrieve a current location, and determine a payee associated with that current location.

The detection screen 304 includes a current location payee section 306 that includes a payee 306a determined from the current location at block 106 of the method 100, as well as a change payee button 306b that allows the user to change the payee 306a designated in the current location payee section 306 in the event that the wrong payee was determined from the current location at block 106. The detection screen 304 also includes a secondary payer user section 308 that includes the secondary payer users determined at block 104 of the method 100, with secondary payer user indicators 308a, 308b, 308c, 308d, 308e, and 308f for each secondary payer user determined at block 104. The user of the user device 300 may select any of the secondary payer user indicators 308a-f to, for example, remove secondary payer users from the secondary payer user section 308 in the event that that user will not be paying for a portion of the bill, discussed below. Thus, in an embodiment, the user of the user device 300 may use the detection screen 304 to confirm the payee to which payments will be made according to the method 100, as well as confirm secondary payer users, which were automatically detected at block 102 and 104 of the method 100, that will be making those payments.

Figure 4A:
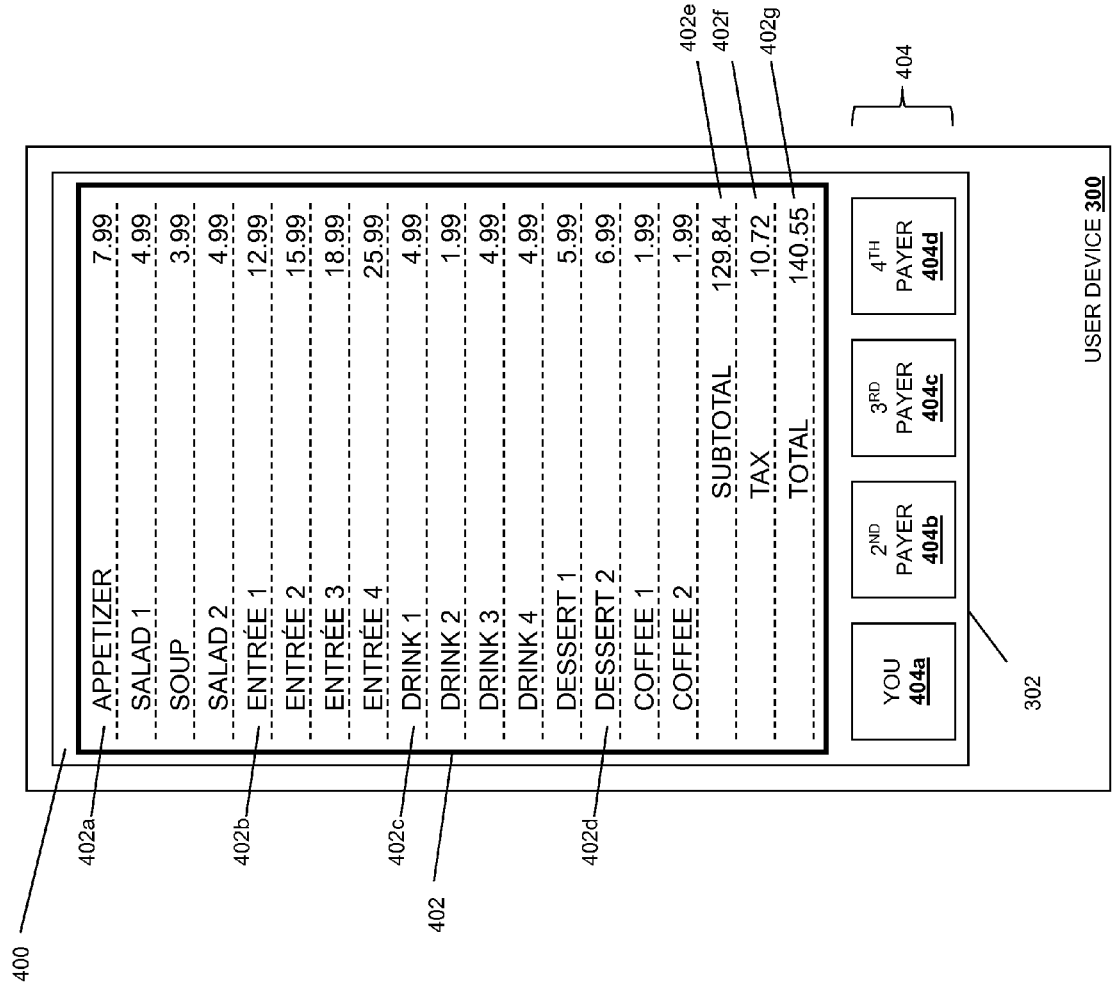
FIG. 4*a* is front view an embodiment of a user device displaying a bill split screen.
Figure 4B:
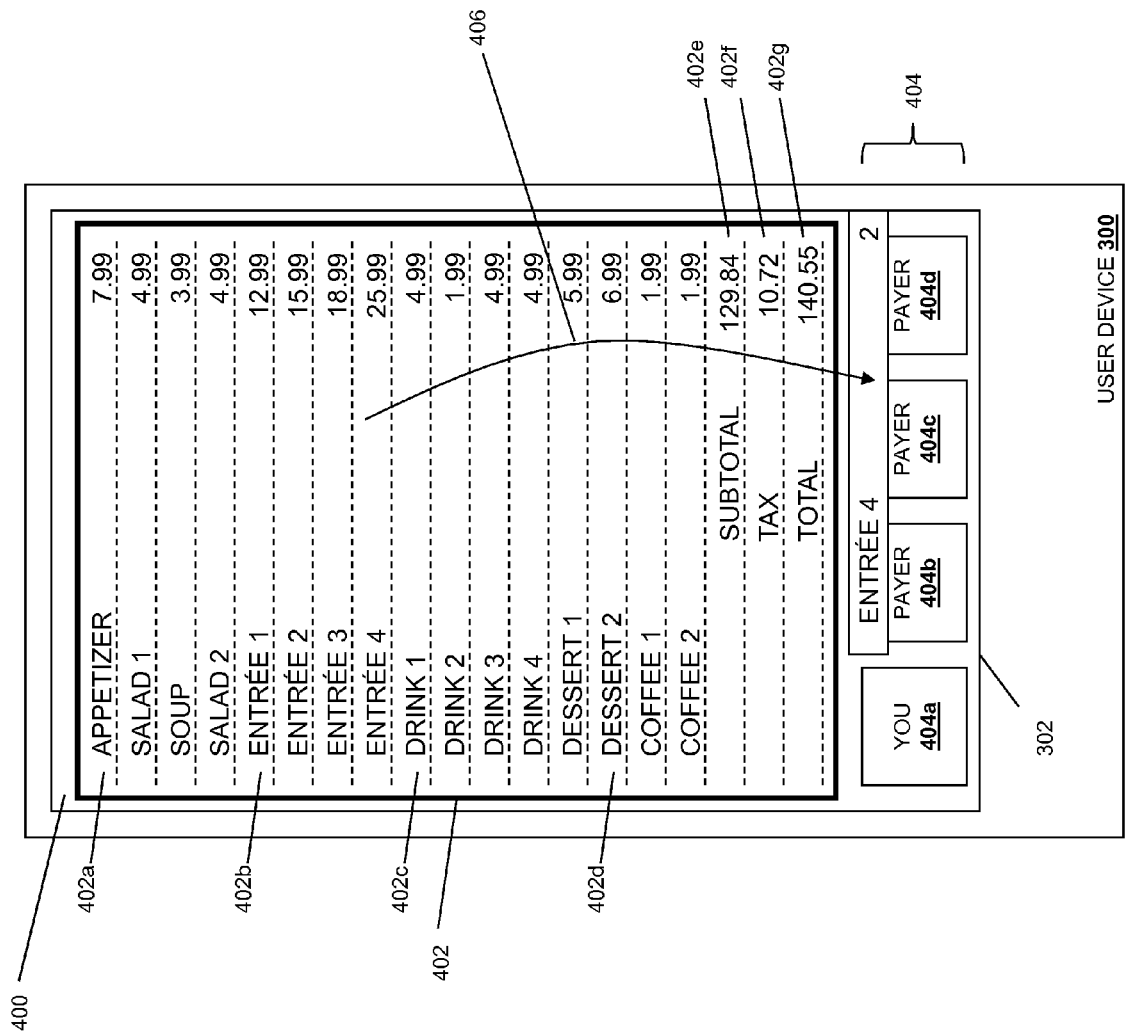
FIG. 4*b* is front view an embodiment of a user device displaying a bill split screen.

Referring now to FIGS. 4a and 4b, the user device 302 is illustrated displaying an embodiment of a bill split screen 400. As discussed above, a bill from the payee associated with the current location determined at block 106 may be provided to the user device 300 to start the method 100, following the start up of a payment application on the user device 300, and/or at any other time during the method 100. The bill split screen 400 includes a bill section 402 as well as a payers section 404. The bill section 402 details the purchases made by the primary payer user and the secondary payer users from the payee, and includes a plurality of items 402a, 402b, 402c, and 402d, their associated prices, a subtotal amount 402e due to the payee, a tax amount 402f, and a total amount due to the payee 402g. The payers section 404 includes a primary payer user indicator 404a, as well as a plurality of secondary payer user indicators 404b, 404c, and 404d.

In an embodiment, the payer section 404 on the bill split screen 400 may be provided following the provision of the detection screen 304, discussed above with reference to FIG. 3, and the selection by the primary payer user of the user device 300 of the secondary payer user indicators 308a, 308c, and 308d (e.g., by deleting the other secondary payer user indicators 308b, 308e, and 308f.) For example, the bill from the payee may be being split between particular payers (e.g., those associated with the primary payer user indicator 404a and the secondary payer user indicators 404b, 404c, and 404d), and secondary payer user indicators on the detection screen 304 associated with payers not making a payment (e.g., spouses of payers making a payment) may be deleted. In another example, the detection of the mobile devices at block 102 and the determination of secondary payer users at block 104 may have provided secondary payer user indicator(s) on the detection screen 304 that were not associated with the bill from the payee (e.g., a mobile device of a user at a different table may be detected, and that user may be associated with the social network of the primary payer user, but may not be responsible for the bill from the payee), and those secondary payer user indicator(s) may be removed by the user. In another example, the primary payer user indicator 404a and the secondary payer user indicators 404b, 404c, and 404d may be associated with the only mobile devices detected at block 102, and each may be responsible for the bill from the payee such that no secondary payer user indicators on the detection screen 304 need be deleted. While a few examples of the provision of the primary payer user indicator 404a and the secondary payer user indicators 404b, 404c, and 404d in the payer section 404 have been provided, one of skill in the art will recognize that secondary payer users associated with a mobile device detected at block 102, a social network of the primary payer user, and the bill provided by the payee may be provided on the bill split screen 400 in any manner while remaining within the scope of the present disclosure.

FIG. 4b illustrates the bill split screen 400 with an embodiment of the items (e.g., one of the plurality of items 402a, 402b, 402c, and 402d) being assigned to the primary payer user and the secondary payer users. As illustrated, the primary payer user may use the user device 302 to select (e.g., using a touch input on the display device 302) any of the items to "drag and drop" (as illustrated by element 406 in FIG. 4b) those items into any of the primary payer user indicator 404a or the secondary payer user indicators 404b, 404c, and 404d. Each item on the bill section 402 may be assigned to the primary payer user or the secondary payer users in this manner. While not illustrated, the payment application and/or bill split screen 400 may include functionality that allows the primary payer user to split individual items between payer users (e.g., an appetizer or desert that was shared between payer users, etc.)

Referring now to FIGS. 1 and 5, the method 100 then proceeds to block 108 where a payment is made to the payee from preferred payments accounts. FIG. 5 illustrates the user device 300 with the display device 302 displaying an embodiment of a payment screen 500 that may be provided in response to the primary payer user assigning each of the items on the bill split screen 400 to each of the primary payer user indicator 404a and the secondary payer user indicators 404b, 404c, and 404d. The payment screen 500 includes a plurality of payer user sections including a primary payer user section 502, and a plurality of secondary payer user sections 504, 506, and 508.

As can be seen in the illustrated embodiment, the primary payer user section 502 includes a preferred payment account 502a that was determined for the primary payer user at block 106 of the method 100, along with a change button 502b that allows the primary payer user to change the preferred payment account 502a in the event the primary payer user would prefer to use a different financial account to make a payment to the payee. The primary payer user section 502 also includes a total due 502c for the primary payer user, a tip input 502d that allows the primary payer user to provide a tip, and a send button 502e. In an embodiment, the send button 502e allows the primary payer user to send a payment to the payee for the total due 502c, along with any tip provided in the tip input 502d, from the preferred payment account 502a.

Each of the secondary payer user sections 504, 506, and 508 of the illustrated embodiment are substantially similar to each other, and thus the description for the secondary payer user sections 504 below may apply to any other secondary payer user sections provided on the payment screen 500. The secondary payer user section 504 includes a preferred payment account 504a that was determined for that secondary payer user at block 106 of the method 100, along with a change button 504b that allows the primary payer user to change the preferred payment account 502a in the event the secondary payer user would prefer to use a different financial account to make a payment to the payee. The secondary payer user section 504 also includes a total due 504c for that secondary payer user, a tip input 504d that allows the secondary payer user to provide a tip, and a send button 504e. In an embodiment, the send button 504e allows the primary payer user to start the process of sending a payment to the payee for the total due 504c, along with any tip provided in the tip input 504d, from the preferred payment account 504a.

Thus, in the embodiment illustrated in FIG. 5, the primary payer user using the user device 300 is provided each secondary payer user section 504, 506, and 508 that includes the preferred payment accounts determined for each secondary payer user at block 106, and may be able to add a tip for each secondary payer user (e.g., through the tip input 504d) and send a payment from the secondary payer users to the payee for their portion of the bill (e.g., using the send button 504e or send all button 510.) In such embodiment(s), the primary payer user may have received prior permission to view and modify (e.g., with respect to the change button 504b) the preferred payment account for each secondary payer user, add a tip amount, and send a payment instruction for each secondary payer user. However, in other embodiments, the preferred payment accounts (e.g., the preferred payment account 504a) may not be displayed in the secondary payer user sections (e.g., the secondary payer user section 504), the tip inputs (e.g., the tip input 504d) may not be provided, and/or the send buttons (e.g., the send button 504e) may not send a payment to the payee. Rather, in some embodiments, the payment screen 500 displayed on the user device 300 may be provided in response to the primary payer user assigning each of the items on the bill split screen 400 to each of the primary payer user indicator 404a and the secondary payer user indicators 404b, 404c, and 404d, but may not include a preferred payment account or a tip input for any of the secondary payer user sections 504, 506, and 508. Instead, the send buttons (e.g., the send button 504e) on the secondary payer user sections may operate to send the secondary payer user sections 504, 506, and 508 to the mobile devices of their respective secondary payer users. In such embodiments, the preferred payment accounts, change buttons, and/or tip inputs, may be provided to the secondary payer users on their mobile devices. A send button may also be provided that sends a payment instruction to make a payment to the payee for a total due, along with any tip provided in a tip input, from the preferred payment account for that secondary payer user.

In an embodiment, the bill split screen 400 may not be provided. Rather, in response to receiving a physical bill, the payment application may present the payment screen 500 with payer sections that allow the total amount for each payer user to be provided by the primary payer user (as determined by the payer users from the physical bill). Similarly as discussed above, the payer sections may be automatically filled with the preferred payment accounts for each payer user, or may be associated with the preferred payment accounts for each payer user such that the preferred payment account is displayed when the payment section is sent to its respective user.

Figure 6:
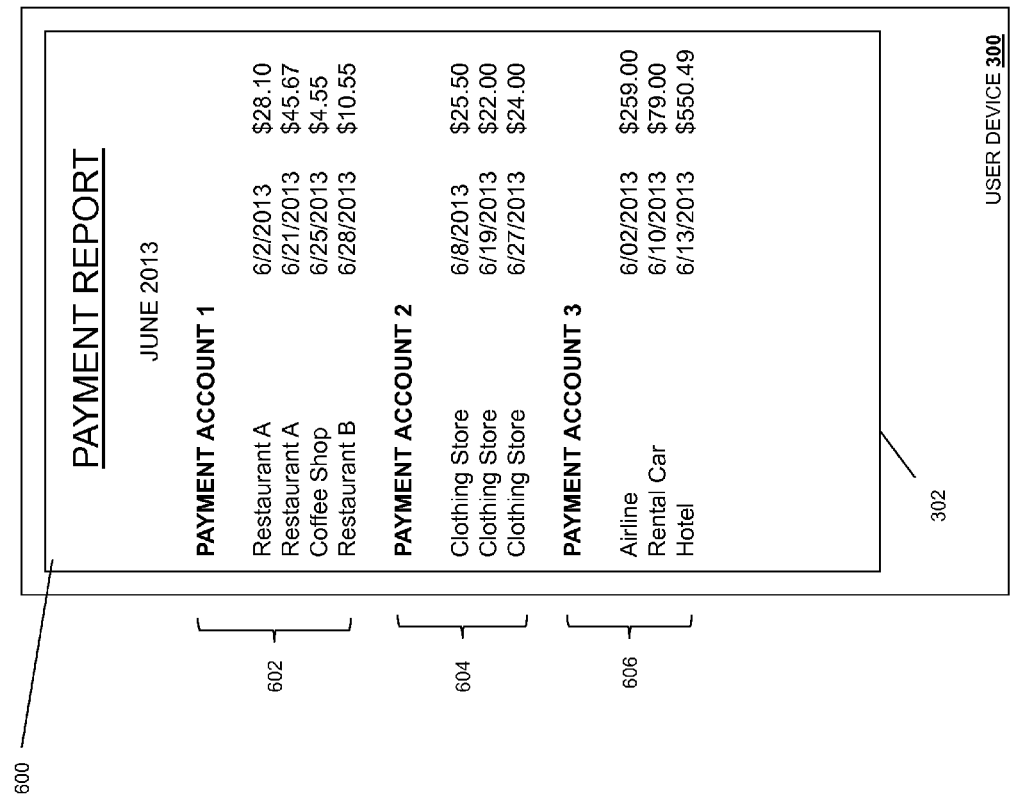
FIG. 6 is a front view illustrating a user device displaying a payments report screen.

Referring now to FIG. 6, the user device 300 is illustrated with the display device 302 displaying a payment report screen 600. The payment report screen 600 is described below as being provided to the primary payer user discussed above, but one of skill in the art will recognize that the designation of preferred payment accounts by any of the secondary payer users will allow for similar payment reports screens to be provided to those users as well. The payment report screen 600 includes a plurality of payment account sections 602, 604, and 606 that detail purchases made using those payment accounts. In an embodiment, a financial account associated with the payment account section 602 may be designated by the user as a preferred payment account to be used with payees associated with eating out (e.g., restaurants, coffee shops, etc.), and the payment account section 602 details a plurality of payments made using that financial account. For example, the financial account associated with the payment account section 602 may be a dining card that provides rewards for purchases made at restaurants and other dining establishments. In an embodiment, a financial account associated with the payment account section 604 may be designated by the user as a preferred payment account to be used with a particular payee (e.g., the Clothing Store in the illustrated embodiment), and the payment account section 604 details a plurality of payments made using that financial account to that payee. For example, the financial account associated with the payment account section 604 and designated for use with a particular payee may be provided by that payee (e.g., the Clothing Store) and may offer discounts on purchases made with that financial account. In an embodiment, a financial account associated with the payment account section 606 may be designated by the user as a preferred payment account to be used with particular purchases (e.g., purchases associated with travel), and the payment account section 606 details a plurality of payments made using that financial account for those types of purchases. For example, the financial account associated with the payment account section 606 may be designated by the primary payer user for use in making travel purchase (e.g., airline tickets, rental cars, taxis, hotels) and may offer rewards on purchases made that are associated with travel.

Thus, systems and methods for auto-detected, multi-payer payments have been described that allow a plurality of payer users to be automatically detected, apportioned a bill, and quickly and easily pay their portion of the bill using an account that may be designated for that payee or that type of purchase. Groups of payer users may benefit from this functionality when multiple group payments are made to different payees (e.g., over an evening or weekend.) For example, a group of payer users may split a first bill from a first payee using the techniques discussed here such that each payer user pays their portion of the bill using a preferred payment account designated for that first payee or first type of purchase, and then the group may split a second bill from a second payee using the techniques discussed here such that each payer user pays their portion of the bill using a preferred payment account designated for that second payee or second type of purchase (e.g., that is different from the first payee or first type of purchase.) As such, multi-payer payments are made quick and easy by auto-detecting the group of payers at any payee location, retrieving the preferred payment account for each payer with regard to the payee being paid or purchases being made, and allowing the bill to be split and the portions of the bill to be quickly and easily paid for using those preferred payment accounts.

In one real-world example of the systems and methods of the present disclosure, a group of users may dine at a restaurant together. Each of the users may have a mobile phone that can detect the presence of the mobile phones belonging to the other users via Bluetooth® communications. A primary payer user may include a payment application on their mobile phone, and that payment application may be operable to access, over the Internet, a social network of the primary payer user. When the bill from the restaurant comes for the meal, the primary payer user may start their payment application, which operates to retrieve the mobile device identifiers from each of the mobile phones of the other users via Bluetooth® communications, determine that those mobile device identifiers are associated with the social network of the primary payer user, and launch a bill split screen that allows each of the users in the group to pay for their portion of the bill. The bill may be split between the users to determine an amount owed by each user, and the payment application may allow those amounts to be sent to the payee.

In another real-world example of the systems and methods of the present disclosure, a group of users may go bowling at a bowling alley together. A primary payer user may have a mobile phone that detects the current location and determines that the bowling alley is associated with that current location. The mobile phone of the primary payer user may also detect the mobile phones of each of the other users to determine that the primary payer user is bowling with a group. The primary payer user may have designated a bowling rewards credit card as the preferred payment account for paying for purchases at the bowling alley in a payment application on the mobile phone. When the time to pay for the bowling comes, the primary payer user may start the payment application, which will detect each of the other users mobile phones, confirm that each of those users are part of a social network of the primary payer user, and provide those users on a bill split screen for a bill from the bowling alley. The primary payer user may have their payment account for the bill auto-filled with their bowling rewards card, and any other users that have designated a preferred payment account for such a purchase may have their payment account for the bill auto-filled as well. Following bowling, the group of users may go to a bar, and when it comes time to pay for that bill, the users may be presented on a bill split screen again, but this time the preferred payment account for a bill from the bar may differ for each user (e.g., to a payment account designated for that bar, alcohol purchases in general, etc.) Users with preferred payment accounts may be provided monthly reports of the payees from which purchases are made, purchases made using particular payment accounts, etc.

Figure 7:
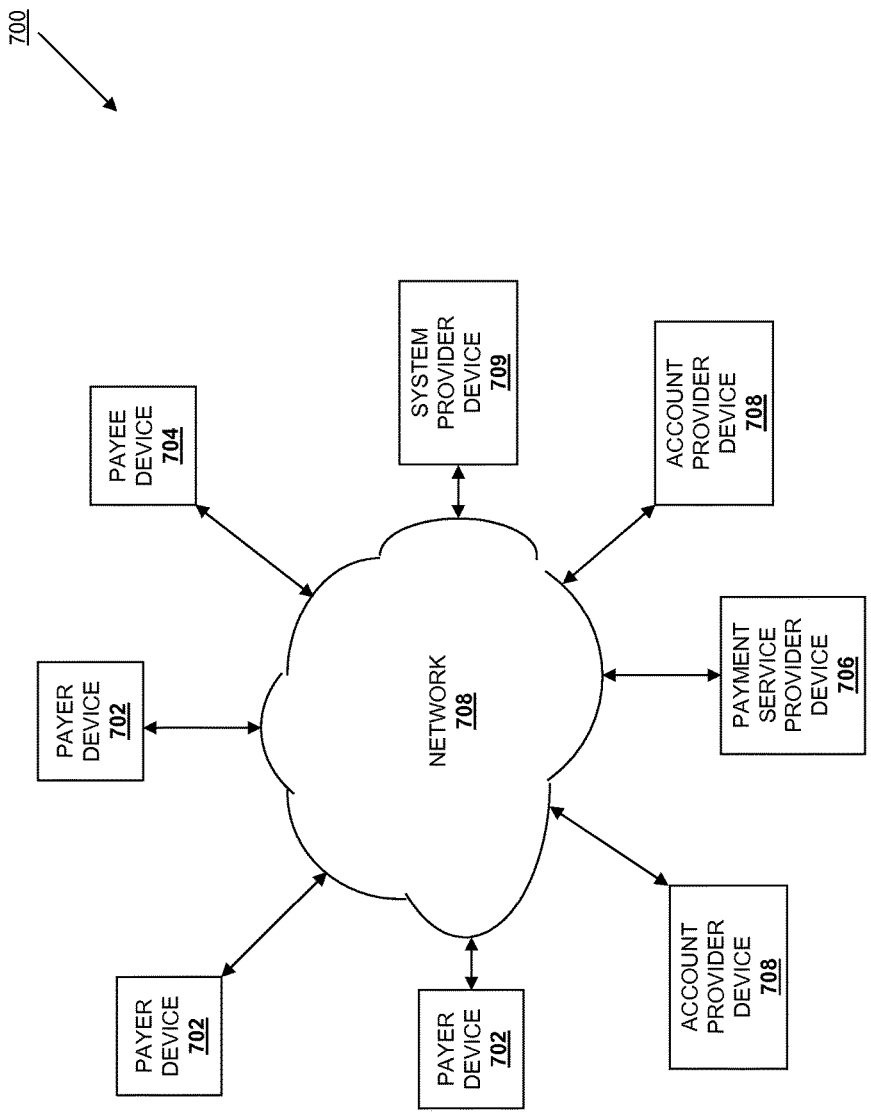
FIG. 7 is a schematic view illustrating an embodiment of a networked system.

Referring now to FIG. 7, an embodiment of a network-based system 700 for implementing one or more processes described herein is illustrated. As shown, network-based system 700 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 7 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 700 illustrated in FIG. 7 includes a plurality of payer devices 702, a plurality of payee devices 704, a payment service provider device 706, a plurality of account holder devices 708, and/or a system provider device 709 in communication over a network 710. Any of the payer devices 702 may be the user device 202 or the mobile devices 204-218, discussed above with reference to FIG. 2, or the user device 300 discussed above with reference to FIGS. 3-6. The payee devices 704 may be the payee devices discussed above and may be operated by the payees discussed above. The payment service provider device 706 may be the payment service provider devices discussed above and may be operated by a payment service provider such as, for example, PayPal Inc. of San Jose, Calif. The account provider devices 708 may be the account provider devices discussed above and may be operated by the account providers discussed above such as, for example, credit card account providers, bank account providers, savings account providers, and a variety of other account providers known in the art. The system provider device 709 may be the system provider devices discussed above and may be operated by the system providers discussed above.

The payer devices 702, payee devices 704, payment service provider device 706, account provider devices 708, and/or system provider device 709 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 700, and/or accessible over the network 710.

The network 710 may be implemented as a single network or a combination of multiple networks. For example, in various embodiments, the network 710 may include the Internet and/or one or more intranets, landline networks, wireless networks, and/or other appropriate types of networks.

The payer devices 702 may be implemented using any appropriate combination of hardware and/or software configured for wired and/or wireless communication over network 710. For example, in one embodiment, the payer device 702 may be implemented as a personal computer of a user in communication with the Internet. In other embodiments, the payer device 702 may be a smart phone, personal digital assistant (PDA), laptop computer, and/or other types of computing devices.

The payer device 702 may include one or more browser applications which may be used, for example, to provide a convenient interface to permit the payer to browse information available over the network 710. For example, in one embodiment, the browser application may be implemented as a web browser configured to view information available over the Internet.

The payer device 702 may also include one or more toolbar applications which may be used, for example, to provide user-side processing for performing desired tasks in response to operations selected by the payer. In one embodiment, the toolbar application may display a user interface in connection with the browser application.

The payer device 702 may further include other applications as may be desired in particular embodiments to provide desired features to the payer device 702. In particular, the other applications may include a payment application for payments assisted by a payment service provider through the payment service provider device 706. The other applications may also include security applications for implementing user-side security features, programmatic user applications for interfacing with appropriate application programming interfaces (APIs) over the network 710, or other types of applications. Email and/or text applications may also be included, which allow the payer to send and receive emails and/or text messages through the network 710. The payer device 702 includes one or more user and/or device identifiers which may be implemented, for example, as operating system registry entries, cookies associated with the browser application, identifiers associated with hardware of the payer device 702, or other appropriate identifiers, such as a phone number. In one embodiment, the user identifier may be used by the payment service provider device 706, account provider device 708, and/or system provider device 709 to associate the user with a particular account as further described herein.

The payee device 704 may be maintained, for example, by a conventional or on-line merchant, conventional or digital goods seller, individual seller, and/or application developer offering various products and/or services in exchange for payment to be received conventionally or over the network 710. In this regard, the payee device 704 may include a database identifying available products and/or services (e.g., collectively referred to as items) which may be made available for viewing and purchase by the payer.

The payee device 704 also includes a checkout application which may be configured to facilitate the purchase by the payer of items. The checkout application may be configured to provide bills to and accept payment information from the user through the payer device 702, the account provider through the account provider device 708, from the payment service provider through the payment service provider device 706, and/or from the system provider device 709 over the network 710.

Figure 8:
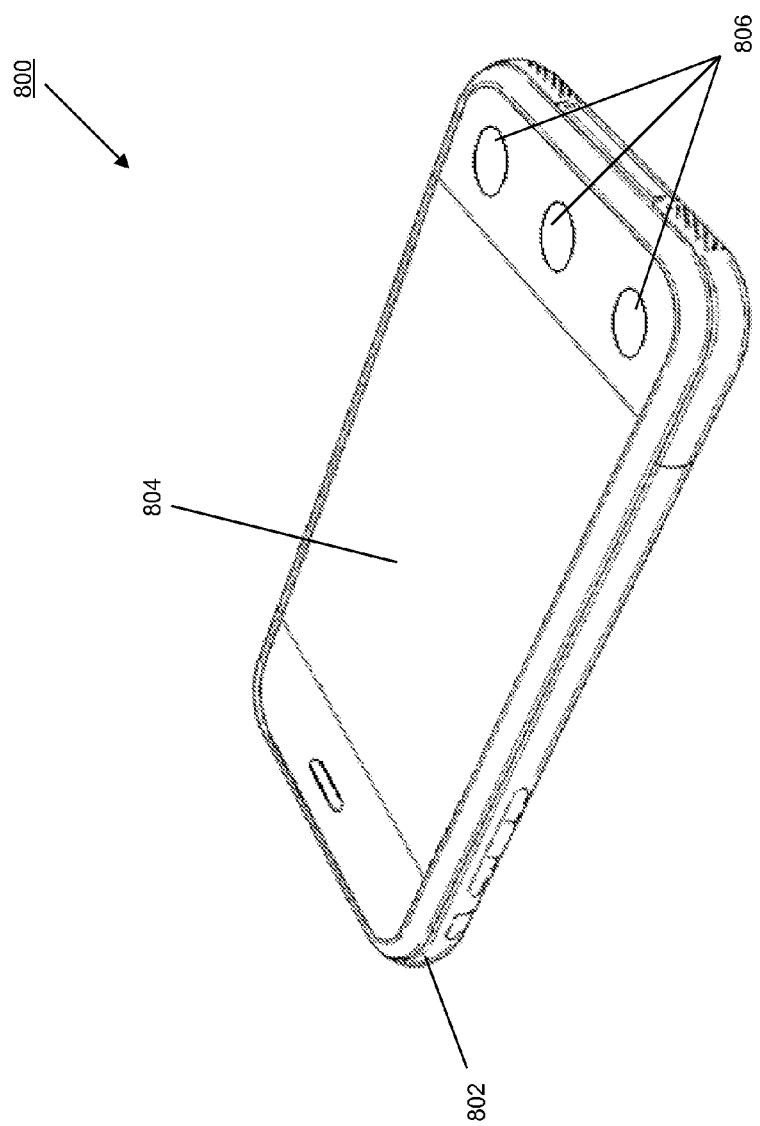
FIG. 8 is a perspective view illustrating an embodiment of a payer device.

Referring now to FIG. 8, an embodiment of a payer device 800 is illustrated. The payer device 800 may be the user device 202 or the mobile devices 204-218, discussed above with reference to FIG. 2, or the user device 300 discussed above with reference to FIGS. 3-6, and/or the payer device 702 discussed above with reference to FIG. 7. The payer device 800 includes a chassis 802 having a display 804 and an input device including the display 804 and a plurality of input buttons 806. One of skill in the art will recognize that the payer device 800 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 9:
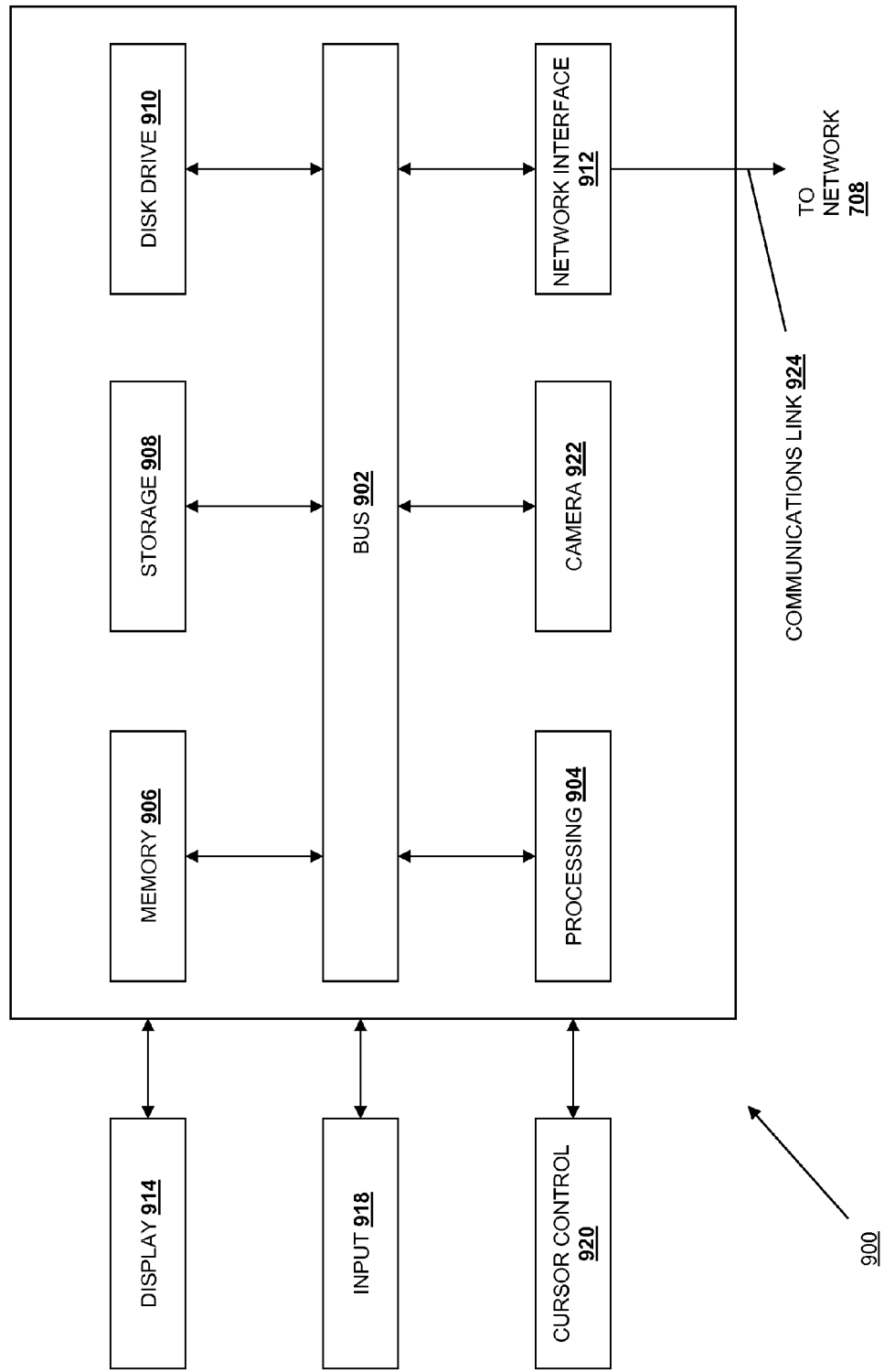
FIG. 9 is a schematic view illustrating an embodiment of a computer system.

Referring now to FIG. 9, an embodiment of a computer system 900 suitable for implementing, for example, the user device 202 or the mobile devices 204-218, discussed above with reference to FIG. 2, or the user device 300 discussed above with reference to FIGS. 3-6, the payer device 702 discussed above with reference to FIG. 7, the payer device 800 discussed above with reference to FIG. 8, the payees device 704, the payment service provider device 706, and/or the account provider device 708, discussed above with reference to FIG. 7, is illustrated. It should be appreciated that other devices utilized by payer, payees, payment service providers, account providers, and system providers in the payment system discussed above may be implemented as the computer system 900 in a manner as follows.

In accordance with various embodiments of the present disclosure, computer system 900, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), and/or a location determination component 922 (e.g., a Global Positioning System (GPS) device as illustrated, a cell tower triangulation device, and/or a variety of other location determination devices known in the art.) In one implementation, the disk drive component 910 may comprise a database having one or more disk drive components.

In accordance with embodiments of the present disclosure, the computer system 900 performs specific operations by the processor 904 executing one or more sequences of instructions contained in the memory component 906, such as described herein with respect to the user device 202, the mobile devices 204-218, the user device 300, the payer device 702, and the payer device 800, the payee device(s) 704, the payment service provider device 706, the account provider device(s) 708, and/or the system provider device 709. Such instructions may be read into the system memory component 906 from another computer readable medium, such as the static storage component 908 or the disk drive component 910. In other embodiments, hard-wired circuitry may be used in place of or in combination with software instructions to implement the present disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 900. In various other embodiments of the present disclosure, a plurality of the computer systems 900 coupled by a communication link 924 to the network 710 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Figure 10:
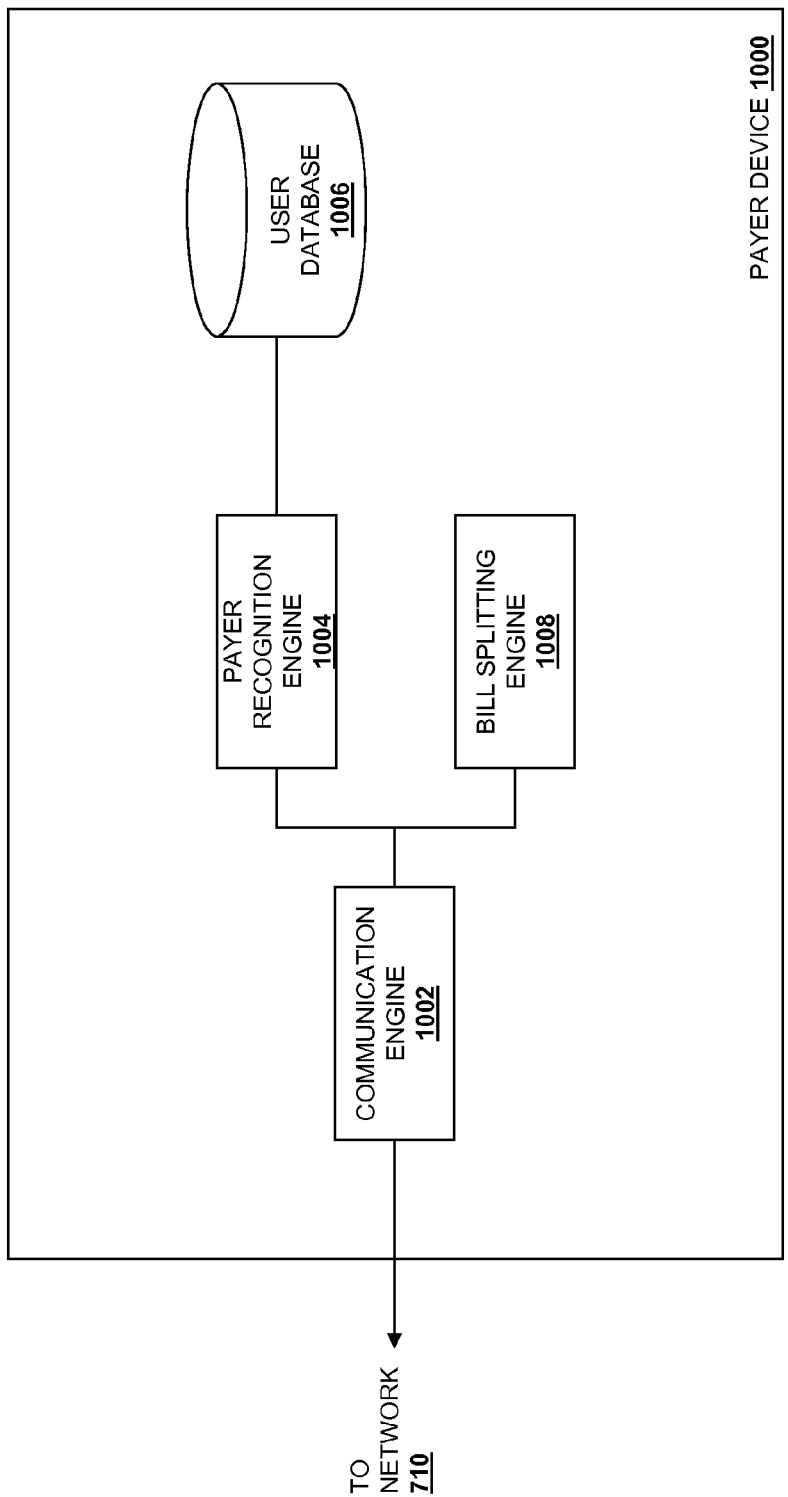
FIG. 10 is a schematic view illustrating an embodiment of a payer device.

Referring now to FIG. 10, an embodiment of a payer device 1000 is illustrated. In an embodiment, the device 1000 may be the user device 202, the mobile devices 204-218, the user device 300, the payer device 702, and/or the payer device 800, and may include components provided by the payee devices, payment service provider devices, account provider devices, and/or system providers devices discussed above. The device 1000 includes a communication engine 1002 that is coupled to the network 710 and to a payer recognition engine 1004 that is coupled to a user database 1006. A bill splitting engine 1008 is also coupled to the communication engine 1002 and the payer recognition engine 1004. The communication engine 1002 may be software or instructions stored on a computer-readable medium that allows the device 1000 to send and receive information over the network 710. The payer recognition engine 1004 may be software or instructions stored on a computer-readable medium that is operable to detect other mobile devices, determine secondary payer users that are associated with a detected mobile device and a social network of a primary payer (e.g., in the user database 1006), determine a current location, a payee associated with the current location, and preferred payment accounts for secondary payers (e.g., stored in the user database 1006), and provide any of the other functionality that is discussed above. The bill splitting engine 1006 may be software or instructions stored on a computer-readable medium that is operable to receive a bill from a payee, provide a bill split screen, allow for items to be assigned from a bill to different payers, provide for the sending of bill portions to other payers and/or the payee, and provide any of the other functionality that is discussed above. While the database 1006 has been illustrated as located in the payer device 1000, one of skill in the art will recognize that it may be connected to the payer recognition engine 1004 through the network 710 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:
1. A system, comprising:
a non-transitory memory; and
one or more hardware processors coupled to the non-transitory memory and configured to read instructions from the non-transitory memory to cause the system perform operations comprising:
  determining a first current location;
  identifying a first payee associated with the first current location;
  receiving, through a network from a first payee device of the first payee, a first bill;
  detecting, using a near field communication device, at least one mobile device;
  retrieving a mobile device identifier from each detected mobile device;
  accessing a database storing social network information about a plurality of secondary payers that are included in a social network of a primary payer;
  identifying, for each of the retrieved mobile device identifiers using the social network information, a respective secondary payer included in the social network of the primary payer in the database;
  providing, for display on a primary payer device of the primary payer using a payment application, a bill splitting graphical user interface that includes identifiers for a plurality of first items included in the first bill;
  receiving, from the primary payer device via the bill splitting graphical user interface, a plurality of inputs that allocate respective first items of the plurality of first items to respective ones of the primary payer and each secondary payer;
  retrieving a preferred payment account for making payments to the first payee for the primary payer and each secondary payer;
  providing, for display on the primary payer device using the payment application a payment confirmation screen that identifies the primary payer, an amount due to the first payee for the first items in the first bill allocated to the primary payer, each second- ary payer, and an amount due to the first payee for first items in the first bill allocated to each secondary payer; and causing, in response to at least one payment instruction received through the payment confirmation screen, a payment to be made to the first payee for each of the first items in the first bill from the primary payer via a primary payer preferred payment account and from each secondary payer via a respective secondary payer preferred payment account.

2. The system of claim 1, wherein operations further comprise:

automatically providing, for display on the primary payer device using the payment application and in response to identifying the respective secondary payer for each of the retrieved mobile device identifiers, a secondary payer selection screen displaying each secondary payer that was identified.

3. The system of claim 2, wherein the operations further comprise:

receiving, through the secondary payer selection screen, at least one secondary payer selection instruction that indicates at least one of the secondary payers for allocating items in the bill.

4. The system of claim 1, wherein the operations further comprise:

determining a second current location;
identifying a second payee associated with the second current location;
receiving, through the network from a second payee device of the second payee, a second bill;
retrieving a preferred payment account for making payments to the second payee for the primary payer and each secondary payer;
providing, for display on the primary payer device using the payment application, the payment confirmation screen that identifies the primary payer, an amount due to the second payee from the primary payer, each secondary payer, and an amount due to the second payee from each secondary payer; and
causing, in response to at least one payment instruction received through the payment confirmation screen, a payment to be made to the second payee from the primary payer via a primary payer preferred payment account that is associated with the second payee, and from each secondary payer via a respective secondary payer preferred payment account that is associated with the second payee.

5. The system of claim 1, wherein a portion of the database storing the social network information about the plurality of secondary payers that are included in the social network of the primary payer, along with the at least one preferred payment account associated with the primary and each secondary payer, is coupled to the one or more processors through a network.

6. The system of claim 1, wherein the primary payer preferred payment account and each secondary payer preferred payment account are retrieved based on the first payee being a particular type of merchant.

7. A method for use by a primary payer device in determining secondary payers that are connected to a primary payer via a social network and that are at a common payee location with the primary payer, as well as determining preferred payment accounts of the primary payer and secondary payers, such that a combined payment may be made to a payee at the common payee location, comprising:

determining, by a primary payer device using a location determination device, a first current location;
identifying, by the primary payer device, a first payee associated with the first current location;
receiving, by a primary payer device through a network from a first payee device of the first payee, a first bill;
detecting, by the primary payer device using a near field communication device, at least one mobile device;
retrieving, by the primary payer device, a mobile device identifier from each detected mobile device;
accessing, by the primary payer device, a database storing social network information about a plurality of secondary payers that are included in a social network of a primary payer;
identifying, by the primary payer device for each of the retrieved mobile device identifiers using the social network information, a respective secondary payer included in the social network of the primary payer;
providing, by the primary payer device for display using a payment application, a bill splitting graphical user interface that includes identifiers for a plurality of first items included in the first bill;
receiving, by the primary payer device via the bill splitting graphical user interface, a plurality of inputs that allocate respective first items of the plurality of first items to respective ones of the primary payer and each secondary payer;
retrieving, by the primary payer device, a preferred payment account for making payments to the first payee for the primary payer and each secondary payer;
providing, by the primary payer device for display using the payment application, a payment confirmation screen that identifies the primary payer, an amount due to the first payee for the first items in the first bill allocated to the primary payer, each secondary payer, and an amount due to the first payee for the first items in the first bill allocated to each secondary payer; and
causing, by the primary payer device in response to at least one payment instruction received through the payment confirmation screen, a payment to be made to the first payee for each of the first items in the first bill from the primary payer via a first primary payer preferred payment account and from each secondary payer via a respective secondary payer preferred payment account.

8. The method of claim 7, further comprising:
automatically providing, by the primary payer device for display using the payment application and in response to identifying the respective secondary payer for each of the retrieved mobile device identifiers, a secondary payer selection screen displaying each secondary payer that was identified.

9. The method of claim 8, further comprising:
receiving, by the primary payer device through the secondary payer selection screen, at least one secondary payer selection instruction that indicates at least one of the secondary payers for allocating items in the first bill.

10. The method of claim 7, further comprising:
determining, by the primary payer device using the location determination device, a second current location;
identifying, by the primary payer device, a second payee associated with the second current location;
receiving, by the primary payer device through the network from a second payee device of the second payee, a second bill;

retrieving, by the primary payer device, a preferred payment account for making payments to the second payee for the primary payer and each secondary payer;

providing, by the primary payer device for display using the payment application, the payment confirmation screen that identifies the primary payer, an amount due to the second payee from the primary payer, each secondary payer, and an amount due to the second payee from each secondary payer; and causing, by the primary payer device in response to at least one payment instruction received through the payment confirmation screen, a payment to be made to the second payee from the primary payer via a second primary payer preferred payment account that is associated with the second payee, and from each secondary payer via a respective secondary payer preferred payment account that is associated with the second payee.

11. The method of claim 10, wherein the second primary payer preferred payment account that is associated with the second payee is different from the first primary payer preferred payment account.

12. The method of claim 7, wherein each respective secondary payer associated with the social network of the primary payer, along with the at least one preferred payment account associated with the primary payer and each secondary payer, are retrieved through a network.

13. The method of claim 7, wherein the primary payer preferred payment account and each secondary payer preferred payment account are retrieved based on the first payee being a particular type of payee.

14. A non-transitory machine-readable medium having stored thereon machine-readable instructions executable to cause a machine to perform operations comprising:

determining a first current location;

identifying a first payee associated with the first current location;

receiving, through a network from a first payee device of the first payee, a bill;

detecting, using a near field communication device, at least one mobile device;

retrieving a mobile device identifier from each detected mobile device;

accessing a database storing social network information about a plurality of secondary payers that are included in a social network of a primary payer;

identifying, for each of the retrieved mobile device identifiers using the social network information, a respective secondary payer included in the social network of the primary payer in the database;

providing, for display on a primary payer device of the primary payer using a payment application, a bill splitting graphical user interface that includes identifiers for a plurality of first items included in the first bill;

receiving, from the primary payer device via the bill splitting graphical user interface, a plurality of inputs that allocate respective first items of the plurality of first items to respective ones of the primary payer and each secondary payer;

retrieving a preferred payment account for making payments to the first payee from the primary payer and each secondary payer;

providing, for display on the primary payer device using the payment application, a payment confirmation screen that identifies the primary payer, an amount due to the first payee for the first items in the first bill allocated to the primary payer, each secondary payer, and an amount due to the first payee for the first items in the first bill allocated to each secondary payer; and causing, in response to at least one payment instruction received through the payment confirmation screen, a payment to be made to the first payee for each of the first items in the first bill from the primary payer via a first primary payer preferred payment account and from each secondary payer via a respective secondary payer preferred payment account.

15. The non-transitory machine-readable medium of claim 14, wherein the operations further comprise:

automatically providing, for display on the primary payer device using the payment application and in response to identifying the respective secondary payer for each of the retrieved mobile device identifiers, a secondary payer selection screen displaying each secondary payer that was identified.

16. The non-transitory machine-readable medium of claim 15, wherein the operations further comprise:

receiving, through the secondary payer selection screen, at least one secondary payer selection instruction that indicates at least one of the secondary payers for allocating items in the bill.

17. The non-transitory machine-readable medium of claim 14, wherein the operations further comprise:

determining a second current location;

identifying a second payee associated with the second current location;

receiving, through the network from a second payee device of the second payee, a second bill;

retrieving a preferred payment account for making payments to the second payee from the primary payer and each secondary payer; and providing, for display on the primary payer device using the payment application, the payment application confirmation screen that identifies the primary payer, an amount due to the second payee from the primary payer, each secondary payer, and an amount due to the second payee from each secondary payer; and causing, in response to at least one payment instruction received through the payment confirmation screen, a payment to be made to the second payee from the primary payer via a second primary payer preferred payment account that is associated with the second payee, and from each secondary payer via a respective secondary payer preferred payment account that is associated with the second payee.

18. The non-transitory machine-readable medium of claim 17, wherein the second primary payer preferred payment account that is associated with the second payee is different from the first primary payer preferred payment account.

19. The non-transitory machine-readable medium of claim 14, wherein each respective secondary payer associated with the social network of the primary payer, along with the at least one preferred payment account associated with the primary payer and each secondary payer, are retrieved through a network.

20. The non-transitory machine-readable medium of claim 14, wherein the primary payer preferred payment account and each secondary payer preferred payment account are retrieved based on the first payee being a particular type of payee.

* * * * *